(12) United States Patent
Hollaway

(10) Patent No.: US 8,294,843 B2
(45) Date of Patent: Oct. 23, 2012

(54) WATERPROOF TOUCH SCREEN PANEL WITH PROTECTIVE FILM

(75) Inventor: Jerrell P. Hollaway, Melbourne, FL (US)

(73) Assignee: Balboa Instruments, Inc., Tustin, CA (US)

( * ) Notice: Subject to any disclaimer, the term of this patent is extended or adjusted under 35 U.S.C. 154(b) by 83 days.

(21) Appl. No.: 12/661,530

(22) Filed: Mar. 19, 2010

(65) Prior Publication Data

US 2011/0228192 A1   Sep. 22, 2011

(51) Int. Cl.
*G02F 1/1333*   (2006.01)
*G06F 3/041*   (2006.01)

(52) U.S. Cl. .......................................... 349/58; 345/173
(58) Field of Classification Search ....................... 349/58
See application file for complete search history.

(56) References Cited

U.S. PATENT DOCUMENTS

| | | |
|---|---|---|
| 4,791,258 A | 12/1988 | Youtz et al. |
| 5,012,124 A | 4/1991 | Hollaway |
| 5,332,944 A | 7/1994 | Cline |
| 5,748,269 A | 5/1998 | Harris et al. |
| 5,883,459 A | 3/1999 | Cline et al. |
| 6,310,612 B1 | 10/2001 | Kotsubo et al. |
| 6,329,593 B1 | 12/2001 | Yang |
| 6,355,881 B1 * | 3/2002 | Braeges et al. ............... 174/521 |
| 6,721,651 B1 | 4/2004 | Minelli |
| 6,888,591 B2 | 5/2005 | Kim |
| 6,897,852 B2 | 5/2005 | Grosfeld et al. |
| 7,184,027 B2 | 2/2007 | Sato et al. |
| 2002/0149571 A1* | 10/2002 | Roberts ......................... 345/174 |
| 2004/0014566 A1 | 1/2004 | Kao |
| 2005/0097666 A1 | 5/2005 | Christensen |
| 2008/0129578 A1 | 6/2008 | Petersen et al. |
| 2008/0246741 A1* | 10/2008 | Hinata ........................... 345/173 |
| 2009/0244026 A1* | 10/2009 | Purdy et al. .................. 345/174 |
| 2010/0238119 A1* | 9/2010 | Dubrovsky et al. ........... 345/169 |

* cited by examiner

*Primary Examiner* — Uyen Chau N Le
*Assistant Examiner* — Chris Chu
(74) *Attorney, Agent, or Firm* — Larry K. Roberts

(57) ABSTRACT

A waterproof touch screen user interface panel constructed in such a way that readily available LCD displays and touch screen switches can be used in a wet environment. A thin plastic film is placed over the top of a touch screen/LCD assembly using moisture resistant adhesive to protect the assembly from the panel's top side and a specially constructed housing allows the use of silicon gel to protect the panel from the bottom side. The plastic film, typically a polycarbonate film, is thin enough to allow activation of the touch screen switches with a soft touch, yet rigid enough to prevent false activations of the switches until touched.

19 Claims, 1 Drawing Sheet

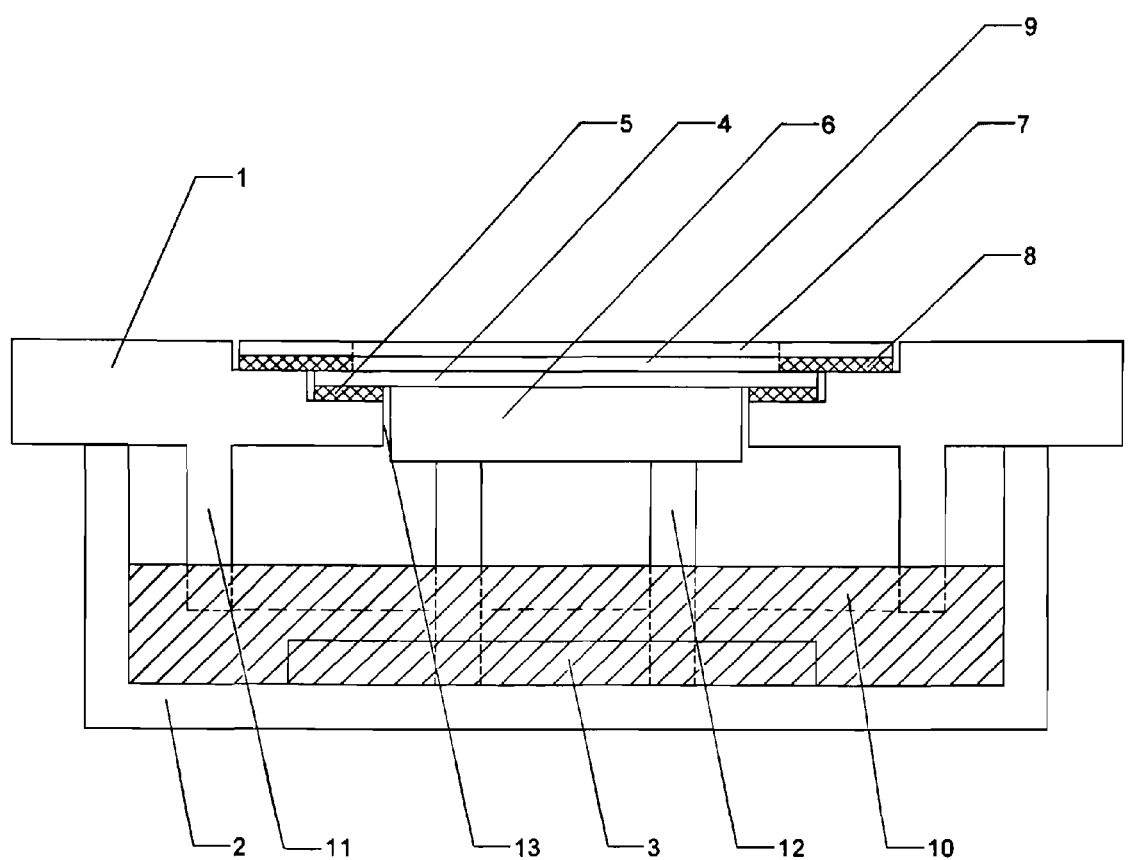

WATERPROOF TOUCH SCREEN PANEL WITH PROTECTIVE FILM

BACKGROUND OF THE INVENTION

1. Field of the Invention

This invention relates to touch screen user interface panels and, more particularity, to touch screen panels used in wet environments, such as in spas and hot tubs.

2. Discussion of Related Art

There have been many touch screen products developed for use in wet environments. Most of these products, however, rely on the waterproof construction of the LCD/touch screen assembly for moisture protection. All of these products are expensive to build because of the specialized construction required for the LCD/touch screen assembly.

Prior to the present invention, few successful efforts have been made to protect an ordinary LCD and touch screen switch from moisture intrusion by the construction of the product's housing.

SUMMARY OF THE INVENTION

The present invention teaches the use of a protective film over a touch screen to protect against moisture intrusion from the top of the product. The film is carefully chosen to lie flat on the surface of the touch screen and be of a thickness that will allow activation of the touch screen switches with normal pressure.

In practice, a touch screen switch is positioned and secured over a LCD display, forming an assembly. The LCD/touch screen assembly is then positioned in a special housing that allows the use of conventional sealing materials to protect against moisture intrusion from all directions.

BRIEF DESCRIPTION OF THE DRAWING

FIG. 1 illustrates the construction of the invention in a cross sectional view.

DESCRIPTION OF THE PREFERRED EMBODIMENTS

Referring now to FIG. 1, the housing of the product consists of upper housing 1 and lower housing 2. LCD/touch screen assembly 6 is positioned in contact with, or very near, protective film 4, which is held in contact with upper housing 1 over cutout area 13 in the housing by means of adhesive layer 5. Another layer of protection is provided by decorative overlay 7, which is held in position by adhesive layer 8. Adhesive layer 8 overlaps the vertical positioning of adhesive layer 5 so that the interface between 1 and 4 is covered.

Circuit board 3 is positioned and secured to lower housing 2 and electrically coupled to LCD/touch screen assembly 6. Silicon gel 10 is placed in lower housing 2 to cover circuit board 3, making circuit board 3 virtually waterproof When upper housing 1 and lower housing 2 are jointed together and secured with fasteners, protrusion 11 from upper housing 1 penetrates silicon gel 10, making the back side of LCD/touch screen 6 also waterproof.

Protrusion 12 from lower housing 2 holds LCD/touch screen assembly 6 in a secured position.

In operation, protective film 4 lies directly on top of the touch screen surface of assembly 6. Film 4 is thin enough to be flexible when lightly touched. A thickness of 0.020 inches is known to work well when the material is polycarbonate. In all cases, the material must be very flat, without high and low spots which could cause false switching. The adhesive material used in 5 and 8 is water resistant. Several foam gasket materials are available, as well as adhesive films, such as 3M 467MP and 468MP. The use of decorative overlay 7 with adhesive layer 8 provides a small air gap 9, which is The same as the thickness of adhesive layer 8. This air gap improves the performance of the product in certain environments.

Additional methods of securing 6 in position with film 4 may be employed. An adhesive material between 6 and 1, correctly applied, can eliminate the need for protrusion 12 from lower housing 2 to secure LCD/touch screen assembly 6.

Lower housing 2 is constructed to allow circuit board 3 to be secured to 2 and covered with sealing material 10, prior to final assembly of the two housing parts, 1 and 2. The final seal is made when protrusion 11 from 1 are embedded in sealing material 10.

When constructed as described, the user interface panel is waterproof from moisture on the top surface of the panel as well as from moisture from the bottom and sides of the panel, even though the LCD/touch screen assembly is not constructed to be waterproof.

In another preferred embodiment, the protective film is ultrasonically bonded to the housing. In yet another preferred embodiment, the film is attached with an adhesive material able to fuse plastic materials, such as PVC cement.

The present invention may be used on spas, hot tubs, baths, swimming pools, steam baths, showers, and similar products.

Others skilled in the arts may make improvements in what is taught herein without departing from the spirit of the present invention.

I claim:

1. A waterproof user interface panel comprising:
an LCD display;
a touch screen switch positioned over and secured to said LCD display to form an LCD-touch screen switch assembly;
a housing for said assembly, the housing including a cutout area; and
a protective film over said assembly and secured to said housing at a peripheral region surrounding the cutout area to prevent moisture intrusion into said housing through the cutout area; and
wherein the protective film lies directly on top of a touch screen surface of said assembly, the protective film configured to be flexible when touched by a user to permit activation of touch screen switches; and wherein:
said housing includes an upper housing and a lower housing, the cutout area being formed in the upper housing, with said assembly of said LCD display and said touch screen switch located in said upper housing and adjacent the cutout area of the upper housing, the lower housing having a bottom surface and a peripheral sidewall defining a housing cavity;
sealing material located in the lower housing covering the bottom surface and having a sealing material top surface above the bottom surface of the lower housing;
said upper housing including a protrusion surrounding the cutout area and which extends into the housing cavity in the lower housing and penetrates the sealing material in the lower housing when said upper and said lower housings are assembled such that a portion of the protrusion is embedded in the sealing material to form a waterproof seal to protect a back side of said assembly of said LCD display and said touch screen switch from external moisture.

2. The panel in claim 1, wherein said film is secured to said housing with a water resistant adhesive.

3. The panel in claim 1, wherein said lower housing has protrusions to hold said LCD and said touch screen switch in a fixed position in said upper housing.

4. The panel in claim 1, wherein a peripheral edge of said protective film and an area of said housing adjacent the peripheral edge of the protective film are covered by a decorative overlay.

5. The panel of claim 1, wherein the protective film is polycarbonate.

6. A waterproof user interface panel comprising:
an LCD display;
a touch screen positioned over and secured to said LCD display to form an LCD/touch screen assembly having a touch screen surface with at least one touch switch;
a housing for said assembly comprising an upper housing and a lower housing, the upper housing including a cutout area, the lower housing including a bottom surface and a peripheral side wall extending upwardly from the bottom surface;
a circuit board secured to the lower housing and electrically coupled to the LCD/touch screen assembly;
sealing material disposed in the lower housing to cover the circuit board to provide water proofing of the circuit board;
the upper housing including a protrusion surrounding the cutout area and extending downwardly to penetrate the sealing material with the upper housing in assembled condition to the lower housing, the protrusion and the sealing material protecting a back side of the LCD/touch screen assembly from water intrusion;
the assembly supported within the housing such that the touchscreen surface is positioned in said cutout area of the upper housing;
a protective film positioned over said assembly and secured to said upper housing to cover the cutout area and prevent moisture intrusion through the cutout area into said housing, wherein the protective film lies directly on top of a touch screen surface of said assembly, the protective film configured to be sufficiently flexible when touched by a user to permit activation of the at least one touch screen switch.

7. The panel of claim 6, wherein the sealing material is a gel material.

8. The panel of claim 6, wherein the LCD/touch screen assembly is not constructed to be waterproof.

9. The panel of claim 6, wherein the protective film is polycarbonate.

10. The panel of claim 6, wherein said film is secured to said upper housing with a water resistant adhesive disposed about a periphery of the cutout area.

11. The panel of claim 6, wherein said lower housing includes one or more protrusions extending upwardly to hold said LCD/touch screen assembly in a fixed position relative to the cutout area of said upper housing.

12. The panel of claim 6, wherein said protective film and said cutout area of the upper housing are covered by a overlay supported by the upper housing to define an air gap between the protective film and the decorative overlay.

13. The panel of claim 12, wherein said overlay is attached to the upper housing by a waterproof adhesive layer covering an interface between said protective film and said upper housing.

14. The panel of claim 6, wherein the sealing material does not fill the lower housing, such that a void is defined between an upper surface level of the sealing material and a lower surface of the upper housing.

15. The panel of claim 6, wherein the upper housing defines the cutout area by a peripheral edge portion surrounding the cutout area, the peripheral edge portion having a recessed, stepped configuration defining a peripheral recessed step surface, and wherein a peripheral edge of the protective film is secured to the peripheral step surface.

16. The panel of claim 15, wherein the recessed, stepped configuration of the peripheral edge portion further defines a second peripheral recessed step surface outside of and above said peripheral step surface, the panel further comprising an overlay disposed over the protective film and having a peripheral edge attached to the second peripheral recessed step surface, the overlay covering an interface between the peripheral edge of the protective film and the recessed, stepped configuration of the upper housing.

17. A waterproof user interface panel comprising:
an electronic display;
a touch screen positioned over and secured to said display to form an display/touch screen assembly having a touch screen surface with at least one touch switch;
a housing for said assembly, the housing including a cutout area; and
a protective film over said assembly and secured to said housing at a peripheral region surrounding the cutout area to prevent moisture intrusion into said housing through the cutout area; and
wherein the protective film lies directly on top of a touch screen surface of said assembly, the protective film configured to be flexible when touched by a user to permit activation of touch screen switches; and wherein:
said housing includes an upper housing and a lower housing, the cutout area being formed in the upper housing, with said assembly located in said upper housing and adjacent the cutout area of the upper housing, the lower housing having a bottom surface and a peripheral sidewall defining a housing cavity;
sealing material located in the lower housing covering the bottom surface and having a sealing material top surface above the bottom surface of the lower housing;
said upper housing including a protrusion surrounding the cutout area and which extends into the housing cavity in the lower housing and penetrates the sealing material in the lower housing when said upper and said lower housings are assembled such that a portion of the protrusion is embedded in the sealing material to form a waterproof seal to protect a back side of said assembly from external moisture.

18. The panel of claim 17, wherein the electronic display is an LCD (liquid crystal display).

19. The panel of claim 17, wherein the sealing material is a silicon gel.

* * * * *